United States Patent
Subramaniam

(10) Patent No.: US 9,935,901 B2
(45) Date of Patent: Apr. 3, 2018

(54) SYSTEM AND METHOD OF ENABLING A MULTI-CHASSIS VIRTUAL SWITCH FOR VIRTUAL SERVER NETWORK PROVISIONING

(75) Inventor: Narayanan Subramaniam, Bangalore (IN)

(73) Assignee: DELL PRODUCTS, LP, Round Rock, TX (US)

( * ) Notice: Subject to any disclaimer, the term of this patent is extended or adjusted under 35 U.S.C. 154(b) by 983 days.

(21) Appl. No.: 13/340,816

(22) Filed: Dec. 30, 2011

(65) Prior Publication Data

US 2013/0173810 A1   Jul. 4, 2013

(51) Int. Cl.
*G06F 15/16* (2006.01)
*H04L 12/931* (2013.01)

(52) U.S. Cl.
CPC ............ *H04L 49/70* (2013.01); *G06F 15/161* (2013.01)

(58) Field of Classification Search
CPC ....... H04L 1/0003; H04L 1/0017; H04L 5/00; H04L 5/18; H04L 12/28; H04L 12/2834; H04L 12/2859; H04L 12/4641; H04L 12/5696; H04L 12/64; H04L 29/08738; H04L 45/00; H04L 47/726; H04L 49/00; H04L 2012/6443; H04L 12/24; H04L 41/00; H04L 45/586; H04L 12/00; H04L 12/66; H04L 29/00; H04L 41/0213; H04L 41/046; H04L 41/069; H04L 41/0806; H04L 41/0816; H04L 41/0823; H04L 41/0886; H04L 41/0896; H04L 41/12
USPC .................................. 709/227, 223; 718/108
See application file for complete search history.

(56) References Cited

U.S. PATENT DOCUMENTS

| | | | |
|---|---|---|---|
| 7,411,973 B2 * | 8/2008 | McDaniel et al. ............ 370/463 |
| 7,412,701 B1 | 8/2008 | Mitra | |
| 7,415,034 B2 | 8/2008 | Muller et al. | |
| 7,590,727 B1 * | 9/2009 | Barnes ................ G06F 11/2023 | 709/208 |
| 7,706,364 B2 | 4/2010 | Smith et al. | |
| 7,941,539 B2 * | 5/2011 | Tripathi .................. H04L 49/70 | 709/203 |
| 8,010,617 B2 * | 8/2011 | Zhuo ..................... G06F 21/554 | 709/208 |
| 8,098,682 B2 * | 1/2012 | McDaniel et al. ............ 370/463 |

(Continued)

OTHER PUBLICATIONS

U.S. Appl. No. 13/216,612, filed Aug. 2, 2011.

*Primary Examiner* — Kevin Bates
*Assistant Examiner* — Ronak Patel
(74) *Attorney, Agent, or Firm* — Larson Newman, LLP

(57) ABSTRACT

A multi-chassis server system has several chassis, each including a chassis management controller (CMC) and a blade server with a blade management controller (BMC) and a virtual switch (VS). The first CMC establishes management sessions with the second CMC and the first BMC. The second CMC establishes a management session with the second BMC. A switch path on a virtual switch is provided via a management session to the first CMC and another switch path on another virtual switch is provided via a management session to the second chassis management controller and by another management session to the first CMC. The switch paths are aggregated into a chassis management controller virtual switch on the first chassis management controller.

20 Claims, 6 Drawing Sheets

(56) References Cited

U.S. PATENT DOCUMENTS

| | | | |
|---|---|---|---|
| 8,203,954 B1* | 6/2012 | Patel | H04L 45/00 370/235 |
| 8,369,296 B2* | 2/2013 | Armstrong et al. | 370/338 |
| 8,767,722 B2* | 7/2014 | Kamble et al. | 370/360 |
| 8,767,751 B2* | 7/2014 | Dhar | H04L 12/4641 370/216 |
| 8,830,823 B2* | 9/2014 | Koponen | H04L 12/4633 370/219 |
| 8,918,631 B1* | 12/2014 | Kumar et al. | 713/151 |
| 2005/0076107 A1* | 4/2005 | Goud | G06F 9/4405 709/223 |
| 2005/0091396 A1* | 4/2005 | Nilakantan et al. | 709/232 |
| 2007/0043860 A1 | 2/2007 | Pabari | |
| 2007/0067432 A1* | 3/2007 | Tarui et al. | 709/223 |
| 2007/0233455 A1* | 10/2007 | Zimmer et al. | 703/27 |
| 2008/0140819 A1* | 6/2008 | Bailey | G06F 13/385 709/223 |
| 2008/0275975 A1* | 11/2008 | Pandey | H04L 49/70 709/223 |
| 2009/0044027 A1* | 2/2009 | Piazza | 713/300 |
| 2009/0150527 A1* | 6/2009 | Tripathi | H04L 45/586 709/221 |
| 2009/0213869 A1* | 8/2009 | Rajendran | H04L 45/00 370/420 |
| 2010/0303075 A1* | 12/2010 | Tripathi | G06F 13/385 370/392 |
| 2011/0085557 A1* | 4/2011 | Gnanasekaran et al. | 370/401 |
| 2011/0087799 A1* | 4/2011 | Padhye | H04L 12/6418 709/235 |
| 2011/0202685 A1 | 8/2011 | Subramanian et al. | |
| 2011/0213863 A1* | 9/2011 | Shah et al. | 709/220 |
| 2011/0225207 A1 | 9/2011 | Subramanian et al. | |
| 2011/0286324 A1* | 11/2011 | Bellagamba | H04L 41/0677 370/219 |
| 2012/0151360 A1* | 6/2012 | Molander et al. | 715/736 |
| 2013/0044641 A1* | 2/2013 | Koponen et al. | 370/255 |

* cited by examiner

SYSTEM AND METHOD OF ENABLING A MULTI-CHASSIS VIRTUAL SWITCH FOR VIRTUAL SERVER NETWORK PROVISIONING

FIELD OF THE DISCLOSURE

The present disclosure generally relates to information handling systems, and more particularly relates to enabling a multi-chassis virtual switch for virtual server network provisioning.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, and networking systems. Information handling systems can also implement various virtualized architectures.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
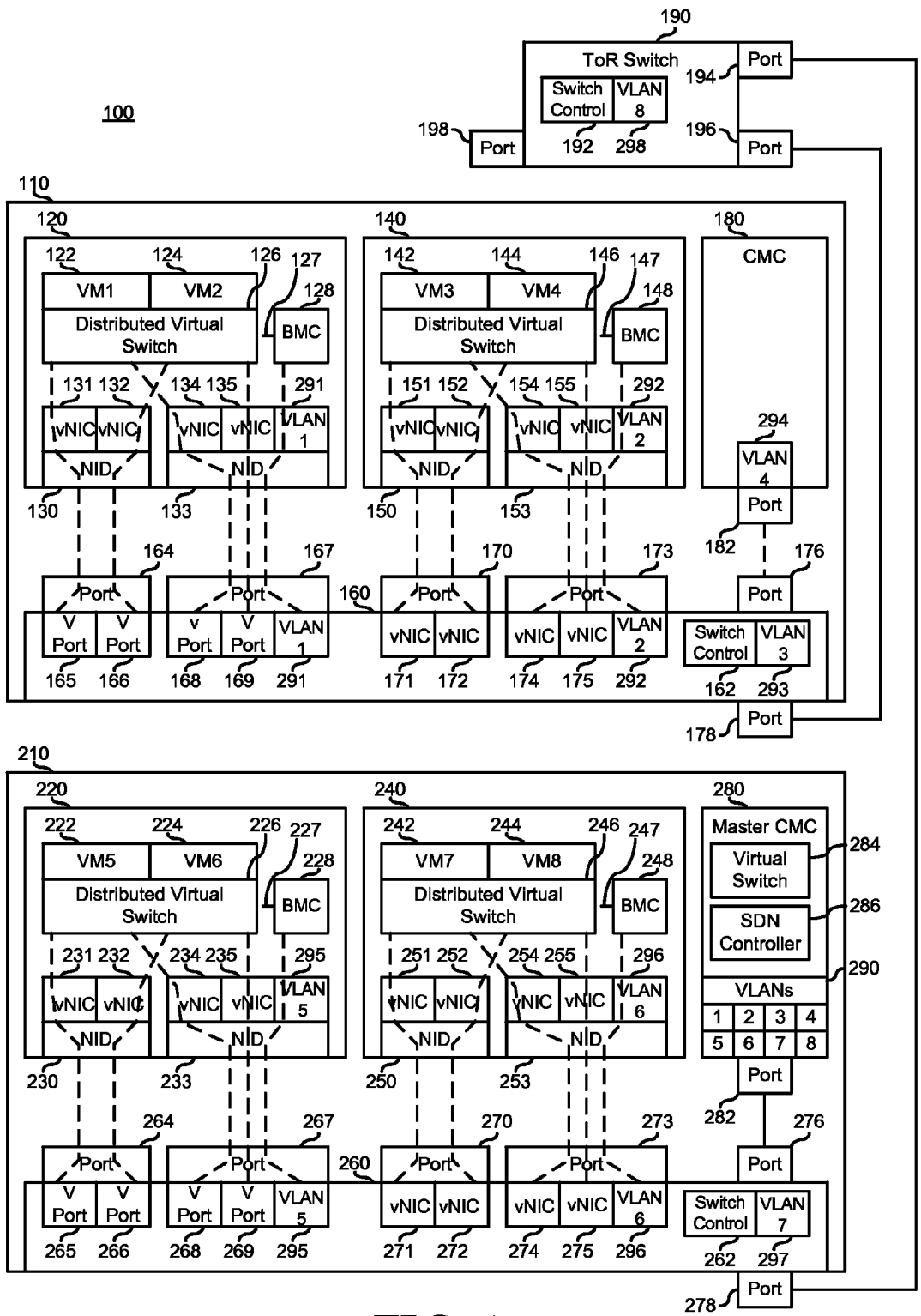
FIG. 1 is a block diagram of a modular environment according to an embodiment of the present disclosure.

FIG. 1 illustrates a modular environment 100 that can include one or more information handling systems. For purposes of this disclosure, the information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic, and operates to execute code. Additional components of the information handling system may include one or more storage devices that can store code, one or more communications ports for communicating with external devices as well as various input and output (I/O) devices, such as a keyboard, a mouse, and a video display. The information handling system may also include one or more buses operable to transmit communications between the various hardware components.

In a particular embodiment, modular environment 100 includes a chassis 110, a chassis 210, and a top-of-rack (ToR) switch 190. Chassis 110 includes a blade 120, one or more additional blades 140, a chassis switch 160, and a chassis management controller (CMC) 180. Blade 120 represents an information handling system such as a rack mounted server, a blade server, or another type of information handling system. Blade 120 includes a virtualization capable operating system, such as a virtual machine manager or a hypervisor, that launches a virtual machine 122, and one or more additional virtual machines 124 on the hardware of the blade. Blade 120 also includes a blade management controller (BMC) 128, a network interface device 130, and one or more additional network interface devices 133. The virtualization capable operating system provides a distributed virtual switch 126 that operates as a switch for traffic between virtual machines 122 and 124. As such, traffic between virtual machines 122 and 124 remains on blade 120, and does not add to the network traffic bandwidth on network interface devices 130 and 133.

Network interface devices 130 and 133 represent hardware devices of blade 120, such as network interface cards (NICs), converged network adapters (CNAs), or other types of network devices, that operate to connect the blade to other devices. An example of network interface devices 130 and 133 includes an Ethernet adapter, a Fibre Channel network device, a Fibre Channel over Ethernet (FCoE) device, or another type of network interface device. Network interface devices 130 and 133 are capable of providing one or more virtual ports that are associated with the virtual machines launched by the virtualization capable operating system, in order to partition the network traffic on the network interface devices. For example, network interface devices 130 and 133 can each provide a 100 gigabit Ethernet (GbE) channel that can be partitioned into a number of virtual channels of various bandwidths, and that are allocated to virtual machines 122 and 124, as needed or desired. As such, network interface device 130 includes virtual NICs (vNICs) 131 and 132 that are associated with virtual machines 122 and 124, respectively, and network interface device 133 includes virtual vNICs 134 and 135 that are associated with virtual machines 124 and 122, respectively. For example, vNICs 131 and 132 can be configured as 10 GbE partitions, thereby allocating 20 Gb of the 100 Gb bandwidth of network interface device 130 to virtual machines 122 and 124. In another example, vNIC 134 can be configured as a 10 GbE partition, and vNIC 135 can be configured as a 1 GbE partition. Here, network traffic on vNIC 135 can be reserved for low bandwidth applications, such as a printer or other such low bandwidth devices. vNICs 131, 132, 134, and 135 are each identified by a unique identifier, such as a Media Access Control (MAC) address, a World Wide Name (WWN), or another unique identifier. Network interface devices 130 and 133 provide for communication between vNICs 131, 132, 134, and 135, and other devices that are connected to the network interface devices as needed or desired. Network interface devices 130 and 133 are also identified by unique identifiers, such as MAC addresses or WWNs.

BMC 128 represents a hardware controller of blade 120 that is embedded on a main board of the blade, a management module of the blade, or a combination thereof. BMC 128 operates to improve the reliability of blade 120 by supporting management functions such as remote power up and power down of blade 120, remote maintenance, inventory, and monitoring of the blade hardware, and firmware maintenance including firmware updates. Blade 120 includes agents that collect system management data that is not directly available on the BMC, such as operating system type and version, and storage and NIC statistics. BMC 128 retrieves the system management data via an operating system-blade management controller passthru (OS-BMC PT) 127. OS-BMC PT 127 represents an internal communication plane, such as an Ethernet-based internal network, that provides Internet protocol (IP) level connectivity between BMC 128 and blade 120. In a particular embodiment, BMC 128 and OS-BMC PT 127 may operate as described in U.S. Patent Publication No. 2011/0202685 to Subramaniam et al., the contents of which are incorporated herein by reference. An example of BMC 128 includes a baseboard management controller, an integrated Dell remote access card (iDRAC), another management controller that operates on an intelligent platform management interface (IPMI) or another standard for system management, or a combination thereof. In a particular embodiment, BMC 128 is an independent information handling system of blade 120, and that executes BMC software to implement the operations described herein.

BMC 128 and OS-BMC PT 127 also operate to implement a software defined network (SDN) that gives access to a forwarding plane of distributed virtual switch 126. The SDN provides visibility into the switching paths of the network traffic through distributed virtual switch 126, and permits the switching paths to be controlled remotely. As such, BMC 128 establishes a virtual local area network (VLAN) 291 session that permits secure communications between the BMC and a VLAN partner in another device that is connected to network interface device 133. In this way, the VLAN 291 partner communicates over VLAN 291 to securely view switching paths of the network traffic through distributed virtual switch 126, and to remotely control the switching paths. An example of an SDN includes a network that is controlled by an OpenFlow protocol, or another switching network instantiated in software.

Blade 140 is similar to blade 120, including a virtualization capable operating system that launches virtual machines 142 and 144. Blade 140 also includes network interface devices 150 and 153 similar to network interface devices 130 and 133, and that connect blade 140 to other devices. Network interface device 150 includes vNICs 151 and 152 that are associated with virtual machines 142 and 144, respectively, and network interface device 153 includes vNICs 154 and 155 that are associated with virtual machines 144 and 142, respectively. vNICs 151, 152, 154, and 155 are each identified by a unique identifier, such as a MAC address or a WWN, as are network interface devices 150 and 153. BMC 148 is similar to BMC 128, and retrieves system management data via OS-BMC PT 147. BMC 148 and OS-BMC PT 147 also operate to implement the SDN to access the forwarding plane of distributed virtual switch 146. As such, BMC 148 establishes VLAN 292 session to permit secure communications between the BMC and a VLAN partner in another device that is connected to network interface device 153 to securely view the switching paths through distributed virtual switch 126, and to remotely control the switching paths.

Chassis switch 160 includes a switch controller 162, and physical ports 164, 167, 170, 173, 176, and 178. Switch controller 162 operates to control the routing and forwarding behavior of chassis switch 160, including open systems interconnection (OSI) model layers 2 and 3 switching, security functions, quality of service (QoS) functions, and other functions of the chassis switch. Switch controller 162 also operates to implement the SDN to give access to a forwarding plane of chassis switch 160, providing visibility into the switching paths of the chassis switch and permitting the switching paths to be controlled remotely. As such, switch controller 162 establishes VLAN 293 session that permits secure communications between the switch controller and a VLAN partner in another device that is connected to one of physical ports 176 or 178. In this way, the VLAN 293 partner communicates over VLAN 293 to securely view switching paths of the network traffic through chassis switch 160, and to remotely control the switching paths.

Physical port 164 is connected to network interface device 130, physical port 167 is connected to network interface device 133, physical port 170 is connected to network interface device 150, physical port 173 is connected to network interface device 153, physical port 176 is connected to a physical port 182 of CMC 180, and physical port 178 is connected to a physical port 196 in ToR switch 190. Chassis switch 160 also provides for port virtualization on one or more of physical ports 164, 167, 170, 173, 176, and 178, such that the physical ports support virtual communication channels. For example, physical port 164 includes virtual ports (vPorts) 165 and 166 that are associated with vNICs 131 and 132, respectively, such that network traffic that has the unique identifier for vNIC 131 as its destination address is routed over a virtual channel from vPort 165, and network traffic for vNIC 132 is routed over a virtual channel from vPort 166. Similarly, physical port 167 includes vPorts 168 and 169 that are associated with vNICs 134 and 135, respectively, such that network traffic for vNIC 134 is routed over a virtual channel from vPort 168, and network traffic for vNIC 135 is routed over a virtual channel from vPort 169. Physical ports 170 and 173 are virtualized similarly to physical ports 164 and 167. The port virtualization on chassis switch 160 also provides for the routing of VLAN traffic. As such, physical port 167 supports VLAN 291 on network interface device 133, and physical port 173 supports VLAN 292 on network interface device 153. An example of chassis switch 160 includes an Ethernet switch, a Fibre Channel switch, an FCoE switch, or another type of switch.

CMC 180 includes a physical port 182, and represents a hardware controller of chassis 110 that operates to improve the reliability of the chassis. As such, CMC 180 supports management functions such as monitoring of system information and status for the elements of the chassis, including accessing system event logs, providing for firmware update to the elements of the chassis, remote power management and power usage reporting, intrusion detection, chassis security management, other chassis management functions, or a combination thereof, as needed or desired. CMC 180 also operates as a centralized locus for interfaces with BMCs 128 and 148, providing a secure interface to enable an administrator of modular environment 100 to access the functions of the BMCs as described above. An example of a secure interface includes a secure web browser interface such as a hypertext transfer protocol secure (HTTPS) interface with a secure socket layer (SSL) or a secure shell (SSH), a user/password log-in authentication, an encrypted interface such as a public key infrastructure (PKI) interface, an interface secured by a VLAN, another secure interface, or a combination thereof. As such, CMC 180 establishes VLAN 294 session that permits secure communications between the CMC and a VLAN partner in another device. In this way, the VLAN 294 partner communicates over VLAN 294 to securely view access the management functions of CMC 180. In a particular embodiment, CMC 180 is an independent information handling system of chassis 110, and that executes CMC software to implement the operations described herein.

Chassis 210 includes a blade 220 and one or more additional blades 240 that are similar to blades 120 and 140, a chassis switch 260 similar to chassis switch 160, and a master CMC 280. Blade 220 includes a virtualization capable operating system that launches virtual machines 222 and 224. Blade 220 also includes network interface devices 230 and 233 similar to network interface devices 130 and 133. Network interface device 230 includes vNICs 231 and 232 that are associated with virtual machines 222 and 224, respectively, and network interface device 233 includes vNICs 234 and 235 that are associated with virtual machines 224 and 222, respectively. vNICs 231, 232, 234, and 235 are each identified by a unique identifier, as are network interface devices 230 and 233. BMC 228 is similar to BMC 128, operating to retrieve system management data via OS-BMC PT 227. BMC 228 and OS-BMC PT 227 operate to implement the SDN, and BMC 228 establishes VLAN 295 session to permit secure communications between the BMC and a VLAN partner. Similarly, blade 240 launches virtual machines 242 and 244, and includes network interface devices 250 and 253. Network interface device 250 includes vNICs 251 and 252 that are associated with virtual machines 242 and 244, respectively, and network interface device 253 includes virtual vNICs 254 and 255 that are associated with virtual machines 244 and 242, respectively. vNICs 251, 252, 254, and 255 are each identified by a unique identifier, as are network interface devices 230 and 233. BMC 248 retrieves system management data via OS-BMC PT 247, implements the SDN, and establishes VLAN 296 session between the BMC and a VLAN partner.

Chassis switch 260 is similar to chassis switch 160, and includes a switch controller 262, and physical ports 264, 267, 270, 273, 276, and 278. Switch controller 262 is similar to switch controller 162, operating to control the routing and forwarding behavior of chassis switch 260, and to implement the SDN to give access to a forwarding plane of chassis switch 260. As such, switch controller 262 establishes VLAN 297 session that permits secure communications between the switch controller and a VLAN partner in another device. In this way, the VLAN 297 partner can securely view switching paths of the network traffic through chassis switch 260, and remotely control the switching paths.

Physical port 264 is connected to network interface device 230, physical port 267 is connected to network interface device 233, physical port 270 is connected to network interface device 250, physical port 273 is connected to network interface device 253, physical port 276 is connected to a physical port 282 of master CMC 280, and physical port 278 is connected to a physical port 194 in ToR switch 190. Chassis switch 260 also provides for port virtualization on one or more of physical ports 264, 267, 270, 273, 276, and 278. As such, physical port 264 includes vPorts 265 and 266 that are associated with vNICs 231 and 232, respectively, and physical port 267 includes vPorts 268 and 269 that are associated with vNICs 234 and 235, respectively. Physical ports 270 and 273 are virtualized similarly to physical ports 264 and 267. The port virtualization on chassis switch 260 also provides for the routing of VLAN traffic, such that physical port 267 supports VLAN 295 on network interface device 233, and physical port 273 supports VLAN 296 on network interface device 253.

ToR switch 190 includes a switch controller 192, and physical ports 194, 196, and 198. Switch controller 192 operates to control the routing and forwarding behavior of ToR switch 190, and to implement the SDN to give access to a forwarding plane the ToR switch. As such, switch controller 192 establishes VLAN 298 session that permits secure communications between the switch controller and a VLAN partner in another device. In this way, the VLAN 298 partner can securely view switching paths of the network traffic through ToR switch 190, and remotely control the switching paths. In particular, physical port 196 is connected to physical port 178 and physical port 194 is connected to physical port 278, so that ToR switch 190 provides connectivity between blades chassis 110 and chassis 220. Physical port 198 is connected to various downlink devices including other modular environments, servers, network switches, storage devices, local area networks (LANs), or other computing devices, such that modular environment 100 operates within a larger datacenter environment.

Master CMC 280 includes a physical port 282, a virtual switch 284, an SDN controller 286, and a VLAN partner 290 for VLANs 291 through 298. Master CMC 280 represents a hardware controller of chassis 210 that operates to improve the reliability of the chassis, and to support management functions for the elements of the chassis. Master CMC 280 also operates as a centralized locus for interfaces with BMCs 228 and 248 to enable an administrator of modular environment 100 to access the functions of the BMCs as described above. In addition, master CMC 280 operates to provide a point of contact through which the operations of CMC 180 are accessed. Thus master CMC 280 provides access to chassis 110 and to chassis 210 for monitoring the system information and status, accessing system event logs, providing firmware updates, remote power management and power usage reporting, intrusion detection, chassis security management, other chassis management functions for both chassis. Master CMC 280 also operates as a master locus for interfaces with BMCs 128, 148, 228, and 248, providing a secure interface to enable an administrator of modular environment 100 to access the functions of the BMCs. In a particular embodiment, Master CMC 280 is an independent information handling system of chassis 210, and that executes CMC software to implement the operations described herein.

SDN controller 286 operates to establish VLANs 291 through 298. In this way master CMC 280 communicates with BMC 128 over VLAN 291, with BMC 148 over VLAN 292, with switch controller 162 over VLAN 293, with CMC 180 over VLAN 294, with BMC 228 over VLAN 295, with BMC 248 over VLAN 296, with switch controller 262 over VLAN 297, and with switch controller 192 over VLAN 298. SDN controller 286 securely views the switching paths of the network traffic through distributed virtual switches 126, 146, 226, and 246, through chassis switches 160 and 260, and through ToR switch 190. SDN controller 286 also operates to remotely control the switch paths through distributed virtual switches 126, 146, 226, and 246, through chassis switches 160 and 260, and through ToR switch 190. SDN controller 286 also provides information related to the switch paths through distributed virtual switches 126, 146, 226, and 246, through chassis switches 160 and 260, and through ToR switch 190, to virtual switch 284. With the switch path information, virtual switch 284 abstracts the network configuration between the virtual machines 122, 124, 142, 144, 222, 224, 242, and 244, and ToR switch 190 to provide a simplified interface to view and control the switching activities of modular environment 100.

In the illustrated embodiment, master CMC 280 operates to directly interact with BMCs 128, 148, 228, and 248, switch controls 162, 192, and 262, and CMC 180 via VLANs 291 through 298 to securely view and control the switch paths, and to interact with the management functions of CMC 180. In another embodiment, CMC 180 establishes VLAN sessions that permit secure communications between the CMC and BMCs 128 and 148 and switch controller 162. In particular, CMC 180 can communicate with BMCs 128 and 148 and switch control 162 to securely view switching paths of the network traffic through distributed virtual switches 126 and 146 and chassis switch 160, and to remotely control the switching paths. Here CMC 180 establishes VLAN 194 between CMC 180 and master CMC 280, and CMC 180 provides status and operation information to master CMC 280. Thus, in this case, master CMC 280 operates to receive the views of the switching paths through chassis 110 from CMC 180, and master CMC 280 provides for the control of the switching paths through chassis 110 to CMC 180.

Also in the illustrated embodiment, CMC 180 and master CMC 280 access BMCs 128, 148, 228, and 248, and switch controllers 162, 192, and 262 through network paths that may be common to the data traffic for virtual machines 122, 124, 142, 144, 222, 224, 242, and 244. In another embodiment, the traffic between CMC 180, master CMC 280, BMCs 128, 148, 228, and 248, and switch controllers 162, 192, and 262 is conducted over a management network of modular environment 100. In particular, modular environment 100 or chassis 110 and 210 can include separate management networks, either through partitioning of dedicated physical ports of chassis switches 160 and 260 and ToR switch 190, or through separate switch components that are dedicated to handling management traffic. As such, where there is a separate management network, VLANs 291 through 298 may or may not be established, as needed or desired.

Figure 2:
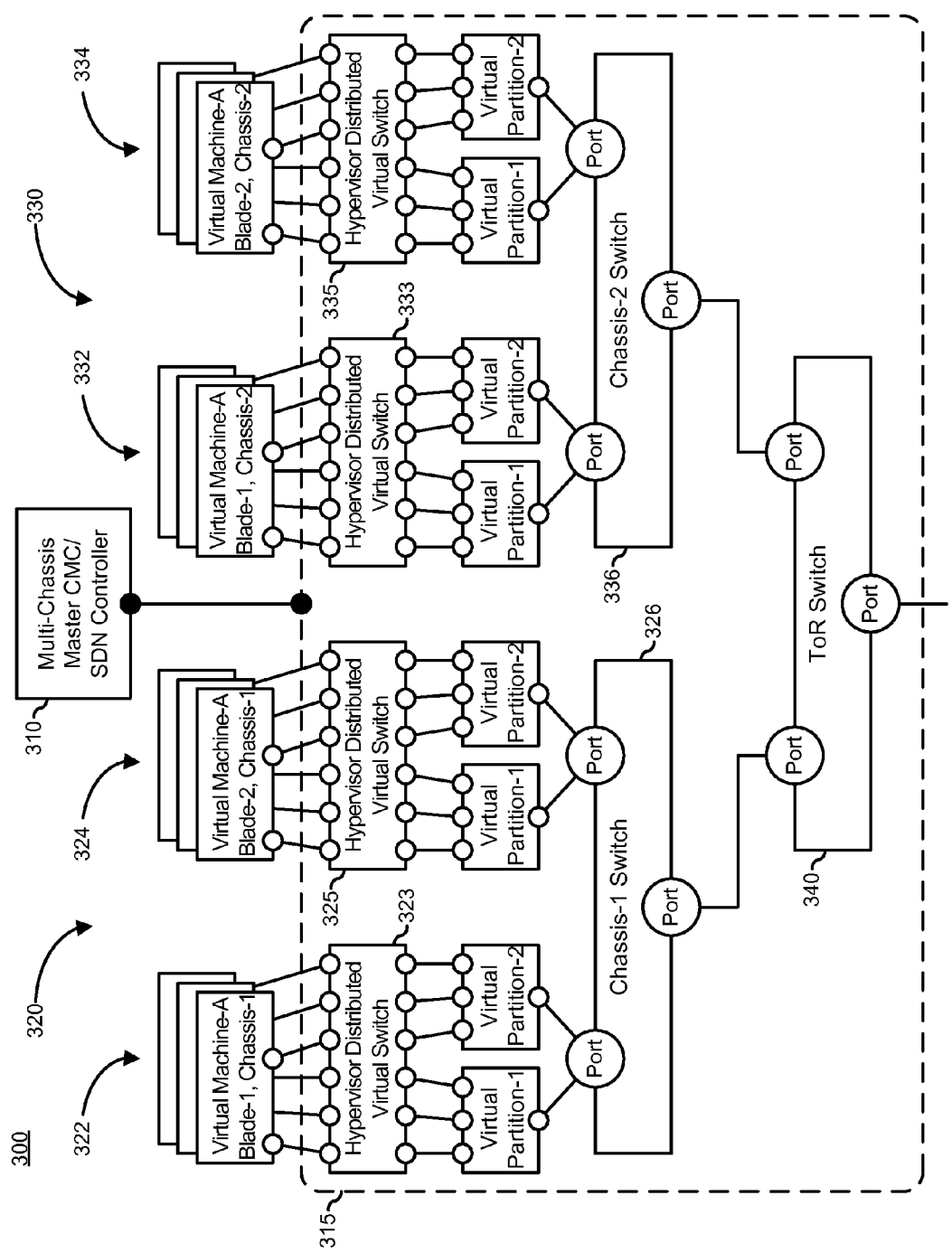
FIGS. 2 and 3 are block diagrams of another modular environment according to an embodiment of the present disclosure.

FIG. 2 illustrates a modular environment 300 similar to modular environment 100, including a multi-chassis master CMC/SDN controller 310, a chassis 320 and one or more additional chassis 330, and a ToR switch 340. Chassis 320 includes a blade 322 and one or more additional blades 324, and a chassis switch 326. Blade 322 launches one or more virtual machines and includes a network interface device that provides virtual partitions that are associated with the virtual machines. As such, blade 322 includes a distributed virtual switch 323 that operates to switch network traffic between the virtual machines and the virtual partitions. Blade 324 is similar to blade 322, launching virtual machines and including associated virtual partitions on a network interface device. A distributed virtual switch 325 switches network traffic between the virtual machines and the virtual partitions on blade 324. Blades 322 and 324 each include blade management controllers that are in communication with master CMC/SDN controller 310 to establish an SDN 315 on modular environment 300. Network traffic from blades 322 and 324 is switched via chassis switch 326 to ToR switch 340. As such, switch controllers in chassis switch 326 and ToR switch 340 are also in communication with master CMC/SDN controller 310 as part of SDN 315.

Chassis 330 is similar to chassis 320, including a blade 332 and one or more additional blades 334, and a chassis switch 336. Blade 332 includes a distributed virtual switch 333 that switches network traffic between virtual machines and virtual partitions on the blade. Similarly, blade 334 includes a distributed virtual switch 335 that switches network traffic between virtual machines and virtual partitions on blade 334, and chassis switch 336 switches network traffic from blades 332 and 334 to ToR switch 340. Blades 332 and 334, and chassis switch 336 are each in communication with master CMC/SDN controller 310 as part of SDN 315. ToR switch 340 is connected to various downlink devices including other modular environments, blades, servers, network switches, storage devices, local area networks (LANs), other computing devices, or a combination thereof, such that modular environment 300 operates within a larger datacenter environment.

Figure 3:
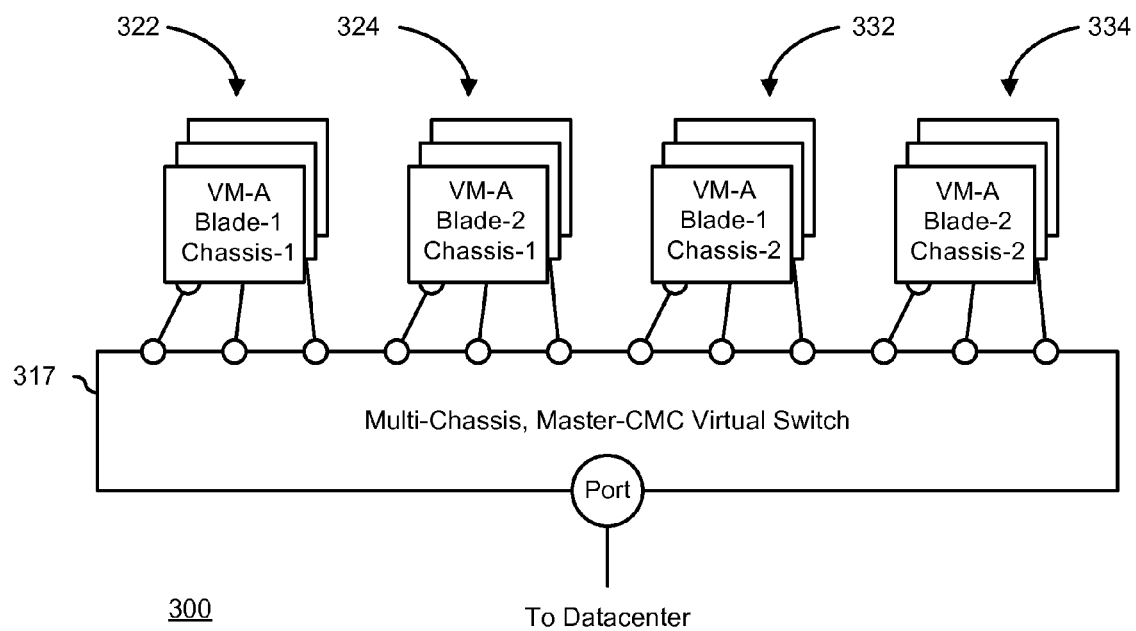

Master CMC/SDN controller 310 communicates with blades 322, 324, 332, and 334, chassis switches 326 and 336, and ToR switch 340 to view the switching paths of the network traffic through distributed virtual switches 323, 325, 333, and 335, through chassis switches 326 and 336, and through ToR switch 340, and to remotely control the switch paths. Master CMC/SDN controller 310 also provides information related to the switch paths through distributed virtual switches 323, 325, 333, and 335, through chassis switches 326 and 336, and through ToR switch 340, to a virtual switch of the master CMC/SDN controller. With the switch path information, the virtual switch abstracts the network configuration between the virtual machines and the datacenter connected to ToR switch 340 to provide a simplified interface to view and control the switching activities of modular environment 300. FIG. 3 illustrates modular environment 300 with the depiction of the multi-chassis master CMC virtual switch 317, showing simplified connections between the virtual machines and the datacenter.

Figure 4:
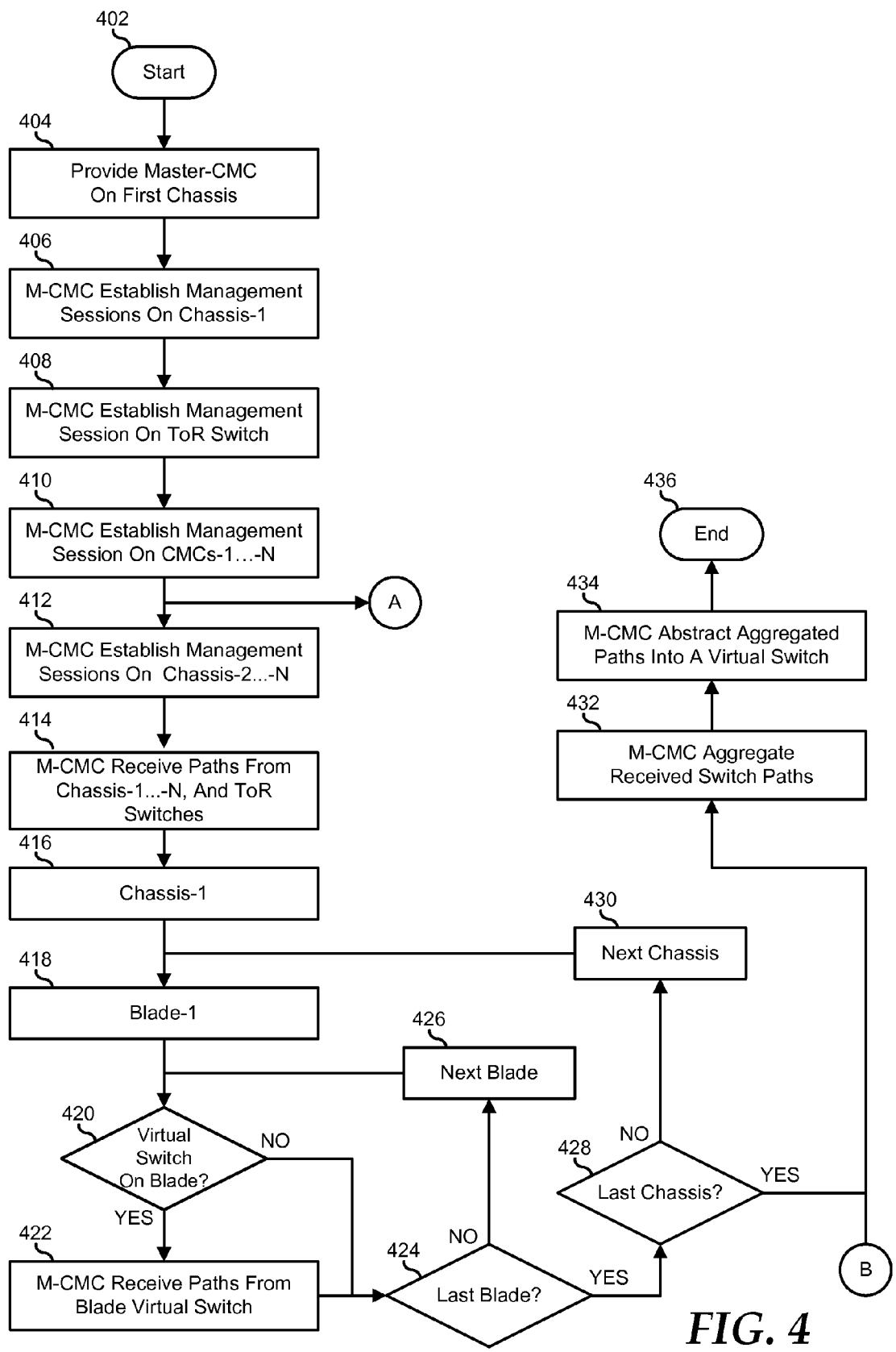
FIGS. 4 and 5 are flowcharts illustrating methods of enabling a multi-chassis virtual switch for virtual server network provisioning according to an embodiment of the present disclosure.

FIG. 4 illustrates a method of enabling a multi-chassis virtual switch for virtual server network provisioning, starting at block 402. A master CMC is provided on a first chassis in block 404. For example, between CMC 180 and master CMC 280, master CMC 280 can be selected as the master CMC for modular environment 100. The master CMC establishes a management session on the first chassis, that is the chassis that includes the master CMC, in block 406. For example, master CMC 280 can establish VLAN 295 with BMC 228, VLAN 296 with BMC 248, and VLAN 297 with chassis switch 260. The master CMC establishes a management session on a ToR switch in block 408. For example, master CMC 280 can establish VLAN 298 with ToR switch 190. The master CMC establishes management sessions with any additional CMCs in block 410. For example, master CMC 280 can establish VLAN 294 with CMC 180. The master CMC establishes management sessions on the additional chassis in block 412. For example, master CMC 280 can establish VLAN 291 with BMC 128, VLAN 292 with BMC 148, and VLAN 293 with chassis switch 160. The master CMC receives switch path information from the chassis switches and the ToR switch in block 414. For example, SDN controller 286 can receive the switch path information from switch controllers 162, 192, and 262.

The first chassis is selected in block 416, and the first blade of the first chassis is selected in block 418. For example chassis 210 and blade 220 can be selected for evaluation. A decision is made as to whether or not the first blade includes a distributed virtual switch in decision block 420. If so, the "YES" branch of decision block 420 is taken and the master CMC receives switch path information from the first blade in block 422, and the method continues in decision block 424 as described below. Here, master CMC 280 can access BMC 228 and OS-BMC PT 227 to identify distributed virtual switch 226, and receive the switch path information from the distributed virtual switch. If the first blade does not include a distributed virtual switch, the "NO" branch of decision block 420 is taken, then a decision is made as to whether or not the selected blade is the last blade in the chassis in decision block 424. If not, the "NO" branch of decision block 424 is taken, the next blade is selected in block 426, and the method returns to decision block 420 where a decision is made as to whether or not the first blade includes a distributed virtual switch. If the selected blade is the last blade in the chassis, the "YES" branch of decision block 424 is taken and a decision is made as to whether or not the chassis is the last chassis in decision block 428. If not, the "NO" branch of decision block 428 is taken, the next chassis is selected in block 430, and the method returns to block 418 where the first blade of the next chassis is selected. If the selected chassis is the last chassis in the modular environment, the "YES" branch of decision block 428 is taken and the master CMC aggregates the received switch path information in block 432. For example, SDN controller 286 can aggregate the switch path information from the elements of modular environment 100 to determine the network configuration of the modular environment. The master CMC abstracts the aggregated paths into a virtual switch in block 434, and the method ends in block 436. For example, SDN controller 286 can provide the network configuration to virtual switch 284 to display a simplified interface to view and control the switching activities of modular environment 100.

Figure 5:
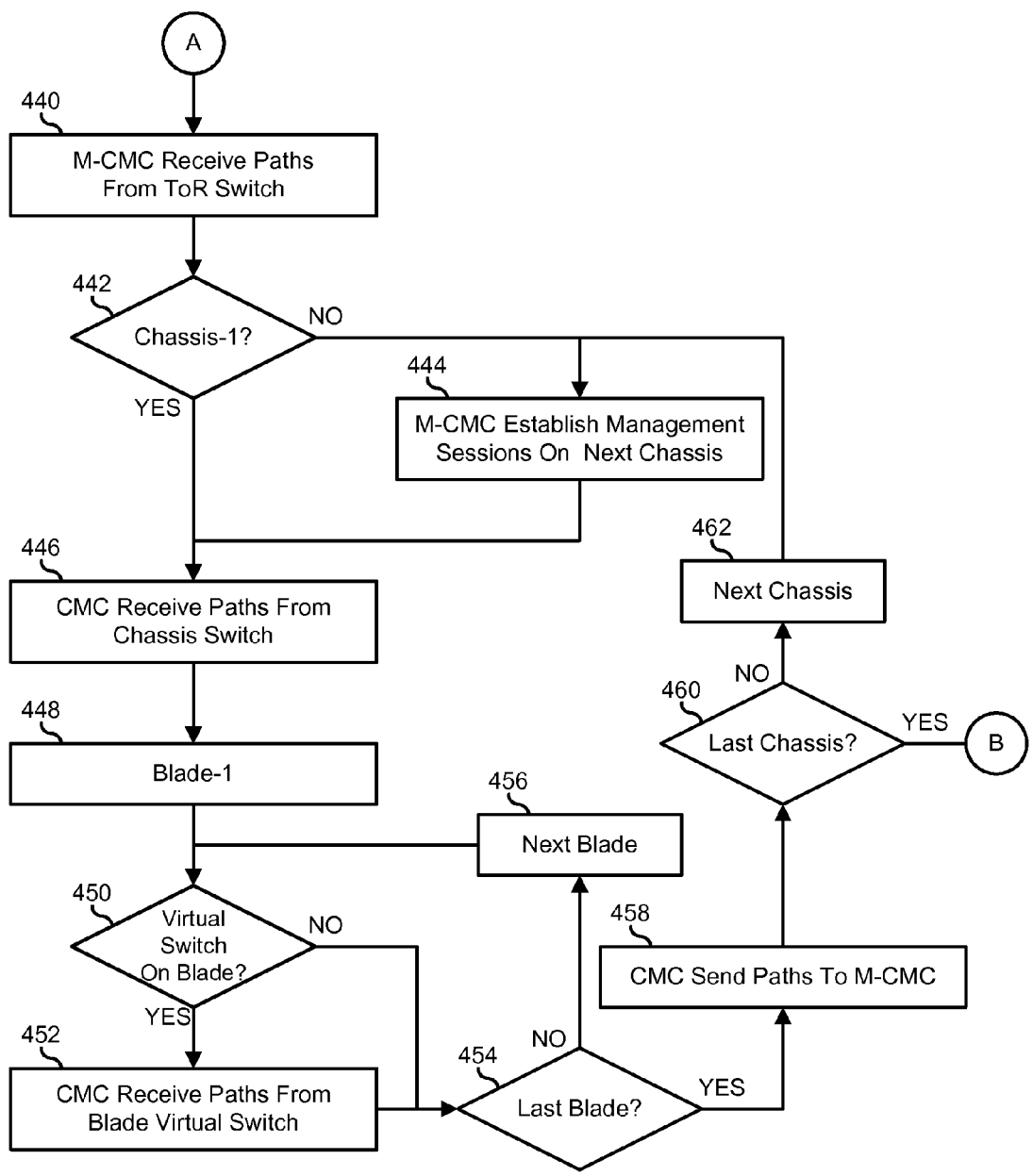

FIGS. 4 and 5 illustrate an alternate method of enabling a multi-chassis virtual switch for virtual server network provisioning, starting at block 402. The alternate method proceeds through blocks 404, 406, 408, and 410 as described above. After the master CMC establishes management sessions with additional CMCs in block 410, the method proceeds to block 440 where the master CMC receives switch path information from the ToR switch. For example, SDN controller 286 can receive the switch path information from switch controller 192. A decision is made as to whether or not the chassis under evaluation is the first chassis in decision block 442. If so, the "YES" branch of decision block 442 is taken and the CMC, which in this instance is the master CMC, receives switch path information from the chassis switches in block 446. For example, SDN controller 286 can receive the switch path information from switch controller 262. The first blade of the first chassis is selected in block 448. For example blade 220 can be selected for evaluation.

A decision is made as to whether or not the first blade includes a distributed virtual switch in decision block 450. If so, the "YES" branch of decision block 450 is taken and the master CMC receives switch path information from the first blade in block 452, and the method continues in decision block 454 as described below. If the first blade does not include a distributed virtual switch, the "NO" branch of decision block 450 is taken, then a decision is made as to whether or not the selected blade is the last blade in the chassis in decision block 454. If not, the "NO" branch of decision block 454 is taken, the next blade is selected in block 456, and the method returns to decision block 450 where a decision is made as to whether or not the first blade includes a distributed virtual switch. If the selected blade is the last blade in the chassis, the "YES" branch of decision block 454 is taken and the selected CMC sends the switch path information to the master CMC in block 458. Note that, in the case where the selected CMC is the master CMC, block 458 is not necessary, as the information is already received by the master CMC in block 452. A decision is made as to whether or not the chassis is the last chassis in decision block 460. If not, the "NO" branch of decision block 460 is taken, the next chassis is selected in block 462, and the method continues in block 444 as described below. If the chassis is the last chassis, the "YES" branch of decision block 460 is taken, and the method proceeds to blocks 432, 434, and 436, as described above.

Returning to decision block 442, if the chassis under evaluation is not the first chassis, the "NO" branch of decision block 442 is taken, the method proceeds to block 444 where the master CMC establishes a management session on the next chassis, and the method continues in block 446 where the newly managed CMC receives switch path information from the chassis switches associated with the newly managed CMC.

Figure 6:
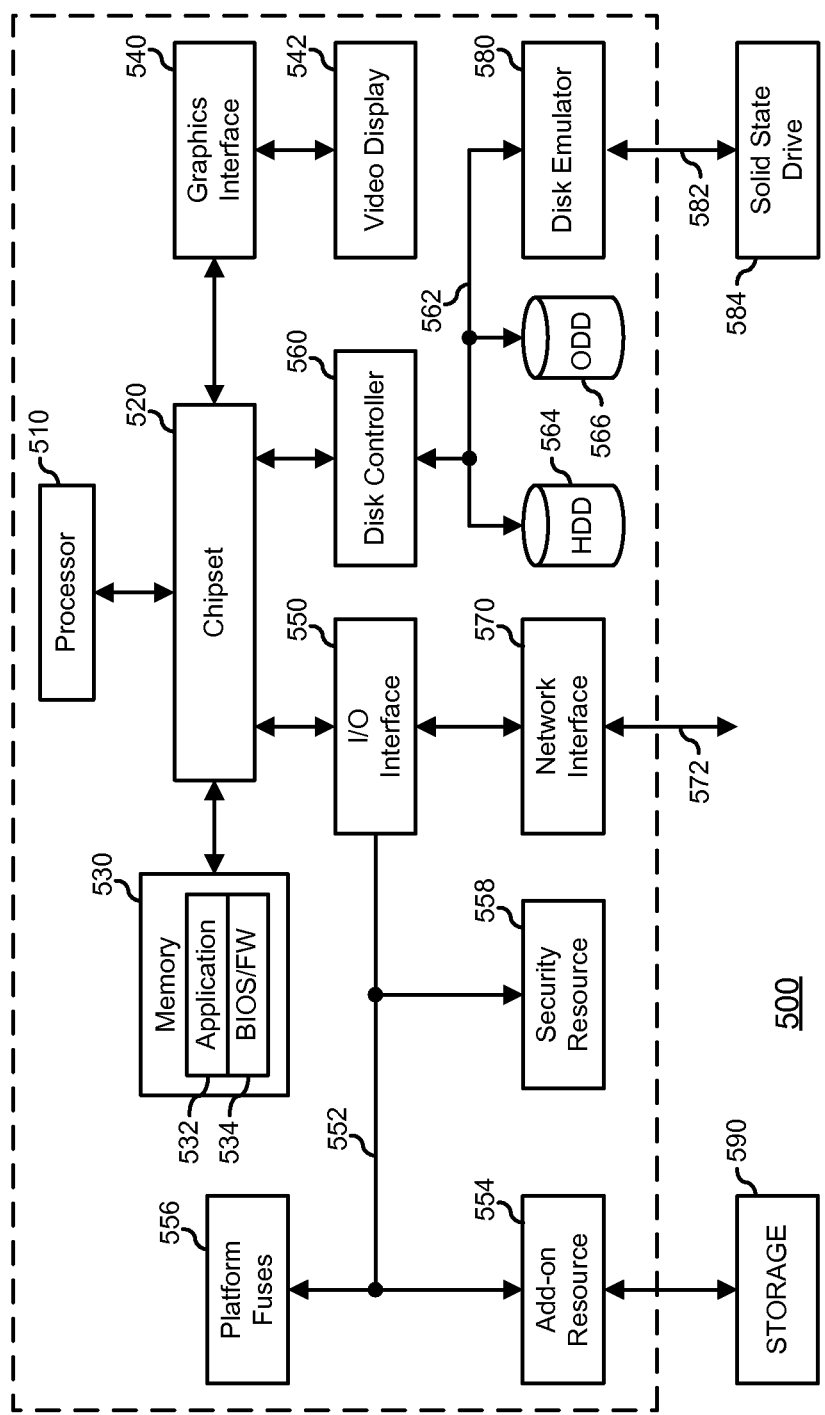
FIG. 6 is a block diagram illustrating an information handling system according to an embodiment of the present disclosure.

FIG. 6 is a block diagram illustrating an embodiment of an information handling system 500, including a processor 510, a chipset 520, a memory 530, a graphics interface 540, an input/output (I/O) interface 550, a disk controller 560, a network interface 570, and a disk emulator 580. In a particular embodiment, information handling system 500 is used to carry out one or more of the methods described herein. In another embodiment, one or more of the systems described herein are implemented in the form of information handling system 500.

Chipset 520 is connected to and supports processor 510, allowing the processor to execute machine-executable code. In a particular embodiment, information handling system 500 includes one or more additional processors, and chipset 520 supports the multiple processors, allowing for simultaneous processing by each of the processors and permitting the exchange of information among the processors and the other elements of the information handling system. Chipset 520 can be connected to processor 510 via a unique channel, or via a bus that shares information among the processor, the chipset, and other elements of information handling system 500.

Memory 530 is connected to chipset 520. Memory 530 and chipset 520 can be connected via a unique channel, or via a bus that shares information among the chipset, the memory, and other elements of information handling system 500. In another embodiment (not illustrated), processor 510 is connected to memory 530 via a unique channel. In another embodiment (not illustrated), information handling system 500 includes separate memory dedicated to each of the one or more additional processors. A non-limiting example of memory 530 includes static random access memory (SRAM), dynamic random access memory (DRAM), non-volatile random access memory (NVRAM), read only memory (ROM), flash memory, another type of memory, or any combination thereof.

Graphics interface 540 is connected to chipset 520. Graphics interface 540 and chipset 520 can be connected via a unique channel, or via a bus that shares information among the chipset, the graphics interface, and other elements of information handling system 500. Graphics interface 540 is connected to a video display 542. Other graphics interfaces (not illustrated) can also be used in addition to graphics interface 540 as needed or desired. Video display 542 includes one or more types of video displays, such as a flat panel display, another type of display device, or any combination thereof.

I/O interface 550 is connected to chipset 520. I/O interface 550 and chipset 520 can be connected via a unique channel, or via a bus that shares information among the chipset, the I/O interface, and other elements of information handling system 500. Other I/O interfaces (not illustrated) can also be used in addition to I/O interface 550 as needed or desired. I/O interface 550 is connected via an I/O interface 552 to one or more add-on resources 554. Add-on resource 554 is connected to a storage system 590, and can also include another data storage system, a graphics interface, a network interface card (NIC), a sound/video processing card, another suitable add-on resource or any combination thereof. I/O interface 550 is also connected via I/O interface 552 to one or more platform fuses 556 and to a security resource 558. Platform fuses 556 function to set or modify the functionality of information handling system 500 in hardware. Security resource 558 provides a secure cryptographic functionality and includes secure storage of cryptographic keys. A non-limiting example of security resource 558 includes a Unified Security Hub (USH), a Trusted Platform Module (TPM), a General Purpose Encryption (GPE) engine, another security resource, or a combination thereof.

Disk controller 560 is connected to chipset 520. Disk controller 560 and chipset 520 can be connected via a unique channel, or via a bus that shares information among the chipset, the disk controller, and other elements of information handling system 500. Other disk controllers (not illustrated) can also be used in addition to disk controller 560 as needed or desired. Disk controller 560 includes a disk interface 562. Disk controller 560 is connected to one or more disk drives via disk interface 562. Such disk drives include a hard disk drive (HDD) 564, and an optical disk drive (ODD) 566, and can include one or more disk drive as needed or desired. ODD 566 can include a Read/Write Compact Disk (R/W-CD), a Read/Write Digital Video Disk (R/W-DVD), a Read/Write mini Digital Video Disk (R/W mini-DVD, another type of optical disk drive, or any combination thereof. Additionally, disk controller 560 is connected to disk emulator 580. Disk emulator 580 permits a solid-state drive 584 to be coupled to information handling system 500 via an external interface 582. External interface 582 can include industry standard busses such as USB or IEEE 1394 (Firewire) or proprietary busses, or any combination thereof. Alternatively, solid-state drive 584 can be disposed within information handling system 500.

Network interface device 570 is connected to I/O interface 550. Network interface 570 and I/O interface 550 can be coupled via a unique channel, or via a bus that shares information among the I/O interface, the network interface, and other elements of information handling system 500. Other network interfaces (not illustrated) can also be used in addition to network interface 570 as needed or desired. Network interface 570 can be a network interface card (NIC) disposed within information handling system 500, on a main circuit board such as a baseboard, a motherboard, or any combination thereof, integrated onto another component such as chipset 520, in another suitable location, or any combination thereof. Network interface 570 includes a network channel 572 that provide interfaces between information handling system 500 and other devices (not illustrated) that are external to information handling system 500. Network interface 570 can also include additional network channels (not illustrated).

Information handling system 500 includes one or more application programs 532, and Basic Input/Output System and Firmware (BIOS/FW) code 534. BIOS/FW code 534 functions to initialize information handling system 500 on power up, to launch an operating system, and to manage input and output interactions between the operating system and the other elements of information handling system 500. In a particular embodiment, application programs 532 and BIOS/FW code 534 reside in memory 530, and include machine-executable code that is executed by processor 510 to perform various functions of information handling system 500. In another embodiment (not illustrated), application programs and BIOS/FW code reside in another storage medium of information handling system 500. For example, application programs and BIOS/FW code can reside in HDD 564, in a ROM (not illustrated) associated with information handling system 500, in an option-ROM (not illustrated) associated with various devices of information handling system 500, in storage system 590, in a storage system (not illustrated) associated with network channel 572, in another storage medium of information handling system 500, or a combination thereof. Application programs 532 and BIOS/FW code 534 can each be implemented as single programs, or as separate programs carrying out the various features as described herein.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality. The information handling system can include memory (volatile (e.g. random-access memory, etc.), non-volatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method of enabling a virtual switch, the method comprising:
    providing a chassis management controller on a first chassis, the chassis management controller including a software defined network (SDN) controller, wherein the first chassis is a first rack mounted server system;
    establishing a first management session between the SDN controller and a first baseboard management controller embedded on a first mainboard of a first blade of the first chassis, wherein the first blade includes a first virtual switch;
    receiving at the first baseboard management controller a first path on the first virtual switch via a pass through between the first baseboard management controller and the first virtual switch;
    providing via the first management session the first switch path to the SDN controller;
    establishing a second management session between the SDN controller and a first chassis switch of the first chassis;
    determining via the second management session a second switch path on the first chassis switch; and
    aggregating, by the SDN controller, the first switch path and the second switch path into a chassis management controller virtual switch on the chassis management controller, such that a packet associated with the first switch path can be routed on either of the first switch path or the second switch path.

2. The method of claim 1, further comprising:
    establishing a third management session between the SDN controller and a second baseboard management controller embedded on a second mainboard of a second blade of a second chassis, wherein the second blade includes a second virtual switch and wherein the second chassis is a second rack mounted server system;
    determining via the third management session a third switch path on the second virtual switch; and
    aggregating, by the SDN controller, the third switch path into the chassis management controller virtual switch.

3. The method of claim 2, further comprising:
    establishing a fourth management session between the SDN controller and a second chassis switch of the second chassis;
    determining via the fourth management session a fourth switch path on the second chassis switch; and
    aggregating, by the SDN controller, the fourth switch path into the chassis management controller virtual switch.

4. The method of claim 3, further comprising:
    establishing a fifth management session between the SDN controller and a top-of-rack switch associated with the first chassis and the second chassis;
    determining via the fifth management session a fifth switch path on the top-of-rack switch; and
    aggregating, by the SDN controller, the fifth switch path into the chassis management controller virtual switch.

5. The method of claim 1, wherein:
    the first management session comprises a first virtual local area network; and
    the second management session comprises a second virtual local area network.

6. The method of claim 1, wherein the first management session and the second management session are established on a management network of the first chassis.

7. The method of claim 1, wherein the first switch path is further determined via an operating system/baseboard management controller passthru on the first blade.

8. The method of claim 1, wherein the first baseboard management controller operates on an intelligent platform management interface.

9. A method of enabling a virtual switch, the method comprising:
    providing a first chassis management controller on a first chassis and a second chassis management controller on a second chassis, wherein the first chassis is a first rack mounted server system and the second chassis is a second rack mounted server;
    establishing a first management session between the first chassis management controller and the second chassis management controller;
    establishing a second management session between the first chassis management controller and a first baseboard management controller embedded on a first mainboard of a first blade of the first chassis, wherein the first blade includes a first virtual switch;

receiving at the first baseboard management controller a first path on the first virtual switch via a pass through between the first baseboard management controller and the first virtual switch;

providing via the second management session the first switch path to the first chassis management controller;

establishing a third management session between the second chassis management controller and a second baseboard management controller embedded on a second mainboard of a second blade of the second chassis, wherein the second blade includes a second virtual switch;

providing via the third management session a second switch path on the second virtual switch to the second chassis management controller;

providing via the first management session the second switch path to the first chassis management controller; and aggregating the first switch path and the second switch path into a chassis management controller virtual switch on the first chassis management controller, such that a packet associated with the first switch path can be routed on either of the first switch path or the second switch path.

10. The method of claim 9, further comprising:
establishing a fourth management session between the first chassis management controller and a first chassis switch of the first chassis;
providing via the fourth management session a third switch path on the first chassis switch to the first chassis management controller; and
aggregating the third switch path into the chassis management controller virtual switch.

11. The method of claim 10, further comprising:
establishing a fifth management session between the second chassis management controller and a second chassis switch of the second chassis;
providing via the fifth management session a fourth switch path on the second chassis switch to the second chassis management controller;
providing via the first management session the fourth switch path to the first chassis management controller; and
aggregating the fifth switch path into the chassis management controller virtual switch.

12. The method of claim 11, further comprising:
establishing a sixth management session between the first chassis management controller and a top-of-rack switch associated with the first chassis and the second chassis;
providing via the sixth management session a fifth switch path on the top-of-rack switch to the first chassis management controller; and
aggregating the fifth switch path into the chassis management controller virtual switch.

13. The method of claim 9, wherein:
the first management session comprises a first virtual local area network;
the second management session comprises a second virtual local area network; and
the third management session comprises a third virtual local area network.

14. The method of claim 9, wherein the second management session is established on a first management network of the first chassis, and the third management session is established on a second management network of the second chassis.

15. The method of claim 9, wherein the first switch path is further determined via an operating system/baseboard management controller passthru on the first blade.

16. The method of claim 9, wherein the first baseboard management controller operates on an intelligent platform management interface.

17. A multi-chassis server system comprising:
a first chassis including:
a first chassis management controller; and
a first blade server including a first baseboard management controller embedded on a first mainboard of the first blade server, and a first virtual switch, wherein the first chassis is a first rack mounted server system; and
a second chassis including:
a second chassis management controller; and
a second blade server including a second baseboard management controller embedded on a first mainboard of the second blade server, and a second virtual switch, wherein the second chassis is a second rack mounted server;
wherein:
the first chassis management controller establishes a first management session with the second chassis management controller and a second management session with the first baseboard management controller;
the second chassis management controller establishes a third management session with the second baseboard management controller;
a first switch path on the first virtual switch is received at the first chassis management controller from the first virtual switch via a pass between the first chassis management controller and the first virtual switch;
the first switch path is provided via the second management session to the first chassis management controller;
a second switch path on the second virtual switch is provided via the third management session to the second chassis management controller;
the second switch path is provided via the first management session to the first chassis management controller; and
the first switch path and the second switch path are aggregated into a chassis management controller virtual switch on the first chassis management controller, such that a packet associated with the first switch path can be routed on either of the first switch path or the second switch path.

18. The multi-chassis server system of claim 17, wherein:
the first chassis further includes a first chassis switch;
the second chassis further includes a second chassis switch;
the first chassis management controller establishes a fourth management session with the first chassis switch;
the second chassis management controller establishes a fifth management session with the second chassis switch;
a third switch path on the first chassis switch is provided via the fourth management session to the first chassis management controller;
a fourth switch path on the second chassis switch is provided via the fifth management session to the second chassis management controller;

the fourth switch path is provided via the first management session to the first chassis management controller; and the third switch path and the fourth switch path are aggregated into the chassis management controller virtual switch.

19. The multi-chassis server system of claim 17, wherein:

the first management session comprises a first virtual local area network;

the second management session comprises a second virtual local area network; and the third management session comprises a third virtual local area network.

20. The multi-chassis server system of claim 17, wherein the second management session is established on a first management network of the first chassis, and the third management session is established on a second management network of the second chassis.

* * * * *